US011443395B2

(12) United States Patent
Redmon et al.

(10) Patent No.: US 11,443,395 B2
(45) Date of Patent: Sep. 13, 2022

(54) MOBILE LEGAL COUNSEL SYSTEM AND METHOD

(71) Applicant: Redmon Jeang LLC, Parker, TX (US)

(72) Inventors: Clayton K. Redmon, Grand Prairie, TX (US); Wei Wei Jeang, Parker, TX (US)

(*) Notice: Subject to any disclaimer, the term of this patent is extended or adjusted under 35 U.S.C. 154(b) by 0 days.

(21) Appl. No.: 15/644,524

(22) Filed: Jul. 7, 2017

(65) Prior Publication Data
US 2018/0025453 A1      Jan. 25, 2018

Related U.S. Application Data

(60) Provisional application No. 62/364,300, filed on Jul. 19, 2016.

(51) Int. Cl.
| | |
|---|---|
| G06Q 50/18 | (2012.01) |
| H04N 7/15 | (2006.01) |
| H04W 4/40 | (2018.01) |
| H04L 65/1069 | (2022.01) |
| H04L 67/12 | (2022.01) |

(Continued)

(52) U.S. Cl.
CPC .......... G06Q 50/18 (2013.01); B64C 39/024 (2013.01); B64D 47/08 (2013.01); G06F 3/04842 (2013.01); H04L 65/1069 (2013.01); H04L 67/12 (2013.01); H04N 7/147 (2013.01); H04N 7/155 (2013.01); H04W 4/40 (2018.02);
(Continued)

(58) Field of Classification Search
CPC combination set(s) only.
See application file for complete search history.

(56) References Cited

U.S. PATENT DOCUMENTS 7,061,521 B2    6/2006  Bulriss
9,288,446 B2 *  3/2016  Mokashi .................. H04N 7/18
(Continued)

FOREIGN PATENT DOCUMENTS

CN     205071154       *  3/2016
WO   2015052896 A1       4/2015

OTHER PUBLICATIONS

International Search Report and Written Opinion received in Patent Cooperation Treaty Application No. PCT/US2017/042838, dated Nov. 8, 2017, 11 pages.

Primary Examiner — Phung-Hoang J Nguyen
(74) Attorney, Agent, or Firm — Wei Wei Jeang; Grable Martin Fulton PLLC

(57) ABSTRACT

A Mobile Lawyer system includes a 360 degree HD video camera configured for mounting inside the passenger compartment of a vehicle; a display screen configured for mounting inside the passenger compartment of a vehicle; and a Mobile Lawyer App downloaded and installed on a mobile telephone in communication with the video camera and display screen, configured, upon command from a user, to notify an attorney located remotely via a cellular and/or computer network, and to display a video image of the remote attorney on the display screen (or the screen of the mobile telephone), and to live-stream a 360 degree video captured by the video camera to the Internet for viewing by the remote attorney and for cloud storage. The introduction of a lawyer on-demand into a police encounter can help to defuse and de-escalate the situation. The lawyer can serve as a live observer, witness, and intermediary who can provide live legal guidance to the user.

8 Claims, 2 Drawing Sheets

(51) Int. Cl.
*B64C 39/02* (2006.01)
*B64D 47/08* (2006.01)
*G06F 3/04842* (2022.01)
*H04N 7/14* (2006.01)
*H04L 67/02* (2022.01)
*H04L 67/52* (2022.01)

(52) U.S. Cl.
CPC .. *B64C 2201/122* (2013.01); *B64C 2201/127* (2013.01); *H04L 67/02* (2013.01); *H04L 67/18* (2013.01)

(56) References Cited

U.S. PATENT DOCUMENTS

| | | | | |
|---|---|---|---|---|
| 2002/0002469 | A1* | 1/2002 | Hillstrom | G06Q 10/10 705/1.1 |
| 2005/0128283 | A1* | 6/2005 | Bulriss | H04N 7/147 348/14.1 |
| 2011/0119197 | A1* | 5/2011 | Turchin | G06Q 10/10 705/311 |
| 2012/0204029 | A1* | 8/2012 | Trabucco | H04N 7/147 713/168 |
| 2014/0214702 | A1* | 7/2014 | Becker | G06Q 50/18 705/311 |
| 2015/0015706 | A1* | 1/2015 | Hatori | G06K 9/00832 348/148 |
| 2015/0371456 | A1* | 12/2015 | Moore, Jr | G07C 5/008 701/1 |
| 2016/0140179 | A1* | 5/2016 | Yuen | G06F 17/30477 707/769 |
| 2016/0173742 | A1* | 6/2016 | Hassan Zureikat | H04N 5/2252 348/144 |
| 2016/0239714 | A1* | 8/2016 | Oami | G06K 9/00832 |
| 2018/0012324 | A1* | 1/2018 | Kelts | G06Q 30/018 |
| 2018/0018831 | A1* | 1/2018 | Thorpe | G06Q 10/10 |

* cited by examiner

MOBILE LEGAL COUNSEL SYSTEM AND METHOD

RELATED APPLICATION

This disclosure claims the benefit of U.S. Provisional Patent Application No. 62/364,300 filed on Jul. 19, 2016, which is hereby incorporated by reference in its entirety.

FIELD

This disclosure relates to mobile software applications, and more particularly to a mobile legal counsel system and method, so that an attorney can be summoned quickly and virtually whenever a need arises to help defuse the situation, run interference, and provide legal advice.

BACKGROUND

According to data compiled by The Washington Post, white people make up roughly 62 percent of the U.S. population but only about 49 percent of those who are killed by police officers. African Americans, however, account for 24 percent of those fatally shot and killed by the police despite being just 13 percent of the U.S. population. These numbers mean black Americans are 2.5 times as likely as white Americans to be shot and killed by police officers. U.S. police officers have shot and killed the exact same number of unarmed white people as they have unarmed black people: 50 each. But because the white population is approximately five times larger than the black population, unarmed black Americans were five times as likely as unarmed white Americans to be shot and killed by a police officer. https://www.washingtonpost.com/news/post-nation/wp/2016/07/11/arent-more-white-people-than-black-people-killed-by-police-yes-but-no/?utm_term=.71a68e6da5fe Some argue that police shooting is racially-based, but there are evidence that show these police officers who commit these atrocities may be motivated by unconscious or implicit bias. There are research studies that support the notion that police professionals use more force, or be quicker to use force, against blacks due to a black-crime implicit bias producing greater perceptions of threat. Studies also support that implicit bias, once recognized, can be counteracted with repeated and intentional training and learning. However, implicit or explicit, the result is still the same—loss of innocent lives.

Whether white or black, implicit or explicit bias, there is a desire to defuse and de-escalate tense situations between the police and members of the general public if the loss of innocent lives can be avoided or reduced.

DETAILED DESCRIPTION

For many African Americans living in the United States, the threat of police brutality and shooting is an everyday reality. Black parents have "The Talk" with their children not of the birds and the bees, but how they must be obedient and compliant whenever they encounter the police.

Police brutality and killing is a deeply-rooted problem that cannot be easily and quickly addressed without multi-pronged persistent efforts. The concept described herein is an effort to introduce technology as one immediate solution to this problem. This concept uses technology to introduce the presence of a third party, a licensed attorney, into a police encounter. The licensed attorney can serve as a live observer, witness, and intermediary who can help to de-escalate and defuse the situation.

Figure 1:
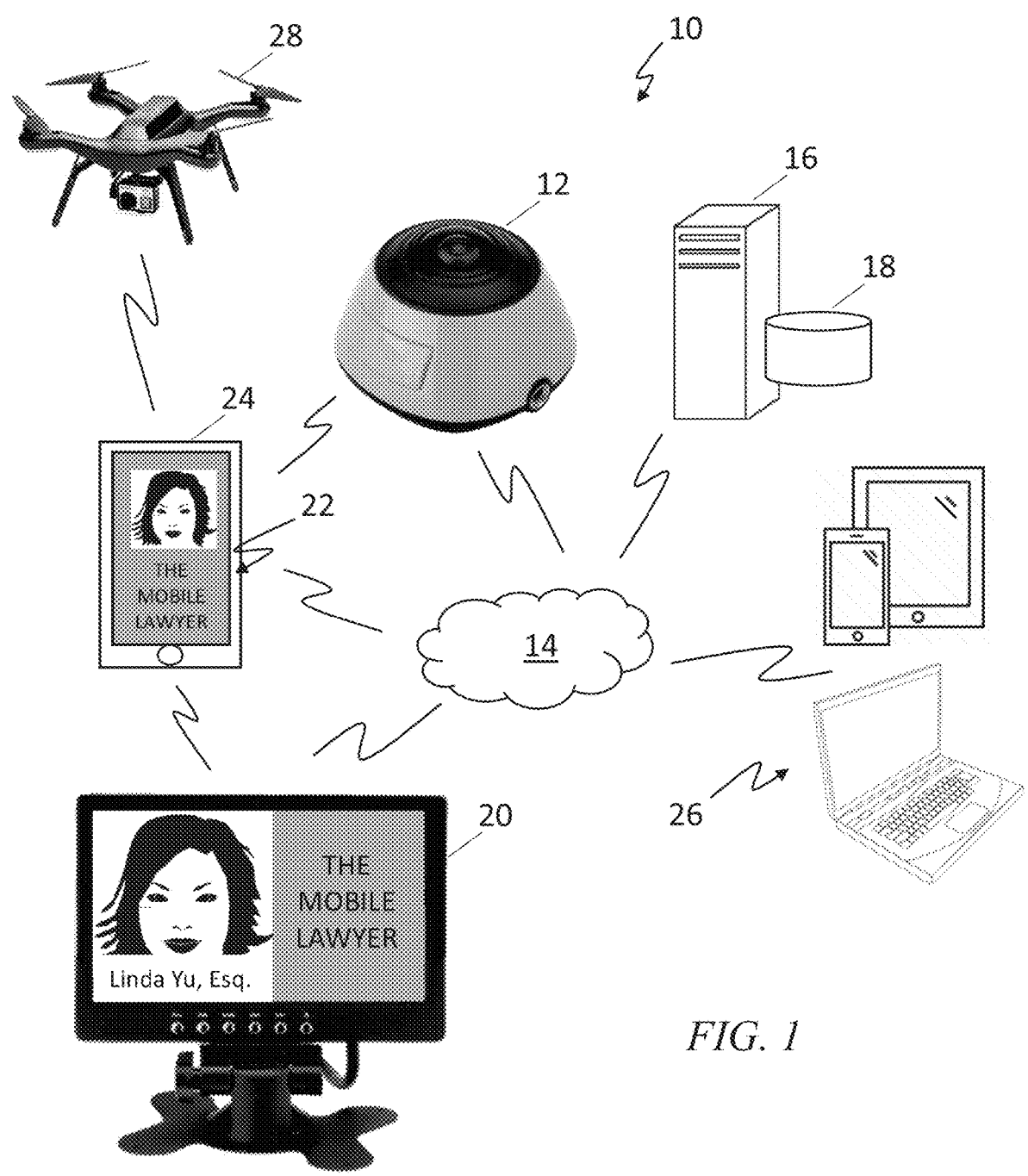
FIG. 1 is a simplified diagram of an exemplary embodiment of a system and method for mobile legal counsel according to the teachings of the present disclosure.

FIG. 1 is a simplified diagram of an exemplary embodiment of a system and method for mobile legal counsel 10 according to the teachings of the present disclosure. The system 10 includes a 360-degree video camera 12 that can live-stream 360 degrees of video data with accompanying audio data over the Internet and/or cellular network 14. The 360-degree camera 12 is preferably high definition and designed for mounting on the dash of a vehicle so that it can capture unobstructed video images of a user seated in the driver's seat as well as the front passenger seat of the vehicle. An example of such a camera is a 1080p sports action camera, Chinavasion product code CVLM-DV141. In an alternate embodiment, the 360-degree camera 12 is joined by additional video cameras mounted at different points of the user's car, inside and/or outside the passenger compartment, to capture video footage from various vantage points to avoid obstacles that may block the view, such as some parts of the car or passengers in the car. In yet another embodiment, a drone-based video camera 28 can be used to augment the live-streamed video data from an overhead vantage point. It is contemplated that the drone can be remotely controlled by either the user, a remote administrator, or the remote lawyer. Additionally, the remote administrator and/or lawyer may also be able to remotely control one or more other video cameras mounted inside and/or outside the passenger compartment.

All of the captured live-stream video data (including audio) are transmitted via a global computer network (Internet) and/or cellular mobile telephone network 14 to a remote server 16 and stored in a database 18, preferably encrypted to ensure privacy. The database 18 further stores the identities, credentials, states where licensed, contact information (e.g., address, email address, and mobile telephone number), and other information of lawyers licensed in various jurisdictions who have been vetted and contracted to be on call during certain days, time periods, and other work parameters to provide mobile lawyer services. The system 10 further includes a dash-mounted display monitor 20 such as the seven-inch LCD display, Chinavasion product code CVABR-LT298. A user may download and install the Mobile Lawyer App 22 onto his mobile phone 24 or another mobile device, such as a wearable device, for example. The video camera 12 and display screen 20 may directly communicate wireless to the server 16 and database 18 via the Internet/cellular network or via the mobile device 24. It is contemplated that the drone may be controlled by administrators or other employees of the mobile lawyer service and/or the remote lawyer.

In operation, the user may initialize the Mobile Lawyer App 22 by setting up a profile with the name, address, phone number, age, sex, race, emergency contact, medical information, and other basic information. The user may become a subscriber by agreeing to make monthly subscription payments to retain the services provided via the Mobile Lawyer App 22. There may be multi-tiered services available tied to different subscription payment amounts. For example, the user may enter into an agreement to pay $9.99 per month for the basic service level and $29.99 per month for a premium service level. The service levels may differ in the amount of coverage in terms of, e.g., hours and jurisdiction. Once becoming a subscriber, the user is issued one or more stickers or decals that can be displayed on the vehicle (on the bumper, in the rear window, in the driver side window, etc.) to clearly mark and identify the user/driver as one that is protected by the Mobile Lawyer App 22.

The user may initiate a Mobile Lawyer Consultation Session and live-stream video capture by the camera(s) by sending a request via the Mobile Lawyer App 22 on his/her mobile device 24. Once the request to live-stream video is received at the server 16, an alert notification is sent to one or more lawyers licensed in the same jurisdiction as the current location of the user. The alert notification may be in the form of a call, text message, email, and another form of message transmitted to and presented on a computing device 26, such as a mobile phone, tablet computer, and laptop computer that is equipped with a video camera. The first lawyer who responds first to handle the consultation session can immediately view the live-streamed video information on a computing device. One or more different criteria may also be used to select the responding lawyer. In a preferred embodiment, the lawyer interfaces with the system 10 via a web browser-based interface. As soon as a lawyer is assigned to handle the consultation session, his/her image as captured by his/her computing device 26 (transmitted via the cloud 14) along with his/her name is displayed on the dash-mounted monitor 20 in the user's vehicle. Alternatively, if the user does not have a dash-mounted display monitor, the lawyer's image is displayed by the user's mobile device 24. In another alternate embodiment, a still image of the selected lawyer stored in the database may be displayed on the display monitor or mobile device if the lawyer is not able to participate via video.

The Mobile Lawyer App 22 has GPS and mapping capabilities, or alternatively has access to these functions of the mobile phone, so that it may be able to pinpoint the location of the user and relay this information to the server 16 so that this information may be used in selecting lawyers who may respond to the alert notification. When GPS is not available, location may be determined by triangulation of cellular towers that are in communication with the user's mobile device.

Figure 2:
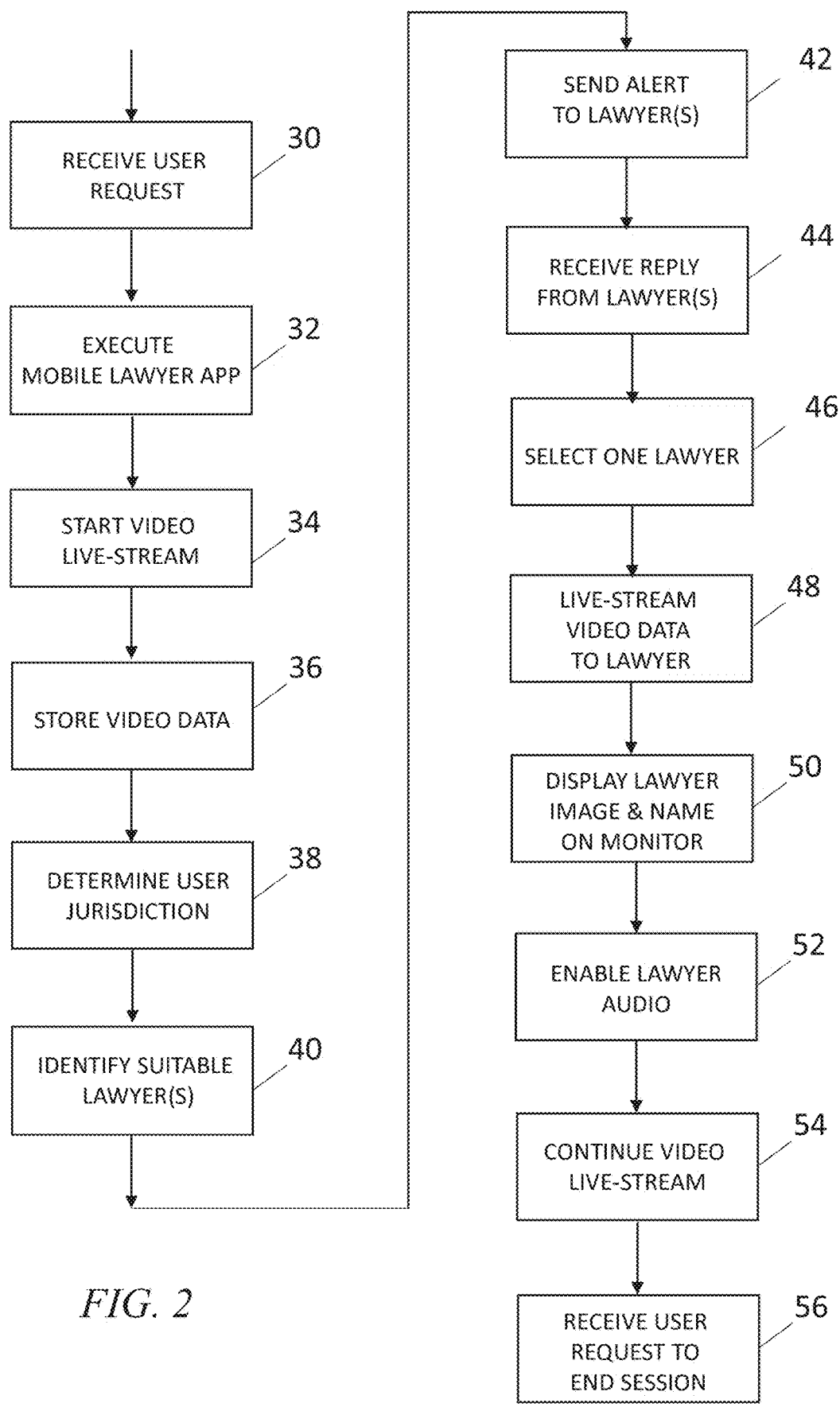
FIG. 2 is a simplified flowchart of a system and method for mobile legal counsel according to the teachings of the present disclosure.

Referring to FIG. 2, a simplified flowchart of the mobile lawyer system and method is shown. In blocks 30 and 32, a request from the user is received by the mobile device to execute the Mobile Lawyer App. The video camera begins to capture video images inside and outside the vehicle and transmits the captured images in real-time to the remote server and database for storage, as shown in blocks 34 and 36. A determination is made as to the location of the user/vehicle, such as the city and state, as shown in block 38. In response to the location of the user, and possibly other criteria (e.g., ranking or rating of lawyers), one or more lawyers are selected and alerts are transmitted to their respective computing devices, as shown in blocks 40 and 42. One or more responses are received from the lawyers, and one is selected, as shown in blocks 44 and 46. The captured video data is immediately transmitted to the lawyer's associated computing device, as shown in block 48. The lawyer's computing device also captures video images of the lawyer and transmits it to the remote server, which in turn transmits it to the display monitor located inside the user's vehicle, as shown in block 50. Audio data captured of the lawyer are also transmitted to the user via either the display monitor or the user's mobile device, as shown in block 52. In this manner, the lawyer has become a third-party observer in a police encounter.

The following is an exemplary scenario in which the Mobile Lawyer App 22 can be used. The user, driving his car, sees that a police squad car is behind him with its lights flashing. The user pulls the car to the side of the road, and upon stopping the car completely, immediately clicks on the Mobile Lawyer App icon displayed on the screen of his mobile phone 24 to execute the app. Alternatively, the Mobile Lawyer App 22 can be initiated by a verbal command. The user also connects the phone to the 360-degree camera and optionally to the display screen. The execution of the Mobile Lawyer App 22 turns on the 360-degree camera 12 and begins live-streaming video data either directly via the Internet/cellular network or via the mobile device 24. The server 16 also receives the request from the user and selects one or more licensed lawyers to send an alert notification. The notification may be done via the attorney's own mobile phone or computer, in the form of text message, a phone call, or another form of alert. The first lawyer who responds immediately has access to the live-streaming video data. Additionally, the lawyer's image is also immediately displayed on the dash-mounted monitor 20. Alternatively, the same can be displayed on the screen of the mobile phone. Because the 360-degree camera 12 is mounted and positioned to optimally capture the actions of the user/driver as well as the police officer that steps up to the car and standing by the driver's side door, the remotely-located lawyer can clearly see what is happening. Because of the 360-degree nature of the video camera, the actions of any passenger in the car and activities that occur around the vehicle can be clearly captured. The lawyer's speech can be relayed by a display screen that has audio speaker capability or through the speakers on the user's mobile phone. The lawyer's image is identified by name and other information that clearly identifies him/her as a licensed attorney for the jurisdiction in which the user is located. The licensed attorney can have a 360-degree view of the scene by accessing the live streamed video from the video camera. Video data from additional camera angles from above and other vehicle-mounted cameras are also live-streamed to the lawyer's computing device. The live streamed video is, at the same time, stored in the cloud data storage 18.

By the time the police officer steps up to the driver's side window, the display screen 20 shows the attorney's face and identification, and the video camera is capturing and live streaming video data. When the police officer first comes into view, the lawyer may choose to introduce him/herself to ensure that the police officer is aware of his/her presence. During the interaction between the police officer and the user, the attorney may remain silent and only act as an observer to allow the police officer to do his/her job without obstruction. However, the lawyer may interject if and when the situation demands it, such as when the police officer's demand or action is illegal under the laws of that jurisdiction. The lawyer may also provide guidance to the user to cooperate with the police officer and serve as a calming influence in a scenario that may be tense for all parties involved.

From the vantage point of the police officer, the presence of the lawyer as a third-party observer may also serve to alleviate concerns he/she may have about the user/driver and remove some of the tension. The police officer may be assured that the presence of the Mobile Lawyer means that the user will likely be compliant and not resist his reasonable demands. Further assurance is that fact that there will be a comprehensive video recording of the incident that can be used to verify either party's testimony.

The Mobile Lawyer may use the attorney functionalities provided by the app such as taking down extemporaneous notes regarding his/her observation of the activities. The attorney function also includes capturing and storing of the video of the attorney in cloud storage.

It is the hope that the Mobile Lawyer technology described herein can provide a desperately needed calming and tempering presence that can be called upon whenever a police encounter occurs. Not unlike having a legal adviser along at all times, the Mobile Lawyer can be summoned to serve, observe, and provide legal guidance to the user in tense situations.

The lawyer selection criteria is primarily jurisdictional due to the licensing requirements for lawyers. Secondarily, users may rate lawyers and those lawyers with poor rating may receiver fewer or no opportunities to respond to consultation requests.

It should be noted that it is contemplated herein that the functionalities of the video camera and display monitor can be combined and integrated into one housing, so that one integrated device is dash-mounted with video camera and display capabilities, as well as communicating with the remote server, either directly via the Internet/cellular network or through the user's mobile device.

It should be understood that user's profile data, subscription information, and video data are protected by password and other security measures. Further, the lawyers' profile and credential information are also protected by password and other security measures. To access these data, the users and lawyers must supply the correct login information. It should be noted that the word "video" used herein is used to denote video and/or audio.

The features of the present invention which are believed to be novel are set forth below with particularity in the appended claims. However, modifications, variations, and changes to the exemplary embodiments described above will be apparent to those skilled in the art, and the system and method for Mobile Lawyer described herein thus encompasses such modifications, variations, and changes and are not limited to the specific embodiments described herein.

What is claimed is:

1. A mobile lawyer system for use during a traffic stop comprising:
    a mobile device having at least one video camera configured for mounting inside the passenger compartment of a vehicle and capture video images of a driver of the vehicle;
    the mobile device further incorporating a display screen viewable by the driver of the vehicle;
    a remote server and a database configured to store information about a plurality of lawyers licensed in at least one jurisdiction;
    the mobile device executing a mobile application configured, upon command from the driver of the vehicle, to communicate with the remote server, wherein the remote server is configured to automatically determine a location of the vehicle, automatically identify a jurisdiction associated with the vehicle location, automatically identify at least one lawyer licensed in the identified jurisdiction, and immediately automatically directly notify the at least one identified lawyer for assistance; and
    the display screen of the mobile device configured to live-stream a video image of the at least one identified lawyer for presentation to the driver of the vehicle, and the at least one video camera is configured to automatically live-stream video captured by the at least one video camera for viewing by the at least one identified lawyer and for storage in the remote database, where the at least one mobile device being configured to automatically enable bi-directional audio and video communication between the at least one identified lawyer and the at least one passenger.

2. The mobile lawyer system of claim 1, wherein the at least one video camera comprises a 360-degree high definition video camera configured to capture video images in a plurality of directions.

3. The mobile lawyer system of claim 1, wherein the at least one video camera comprises a video camera mounted on a drone.

4. The mobile lawyer system of claim 1, wherein the at least video camera comprises a plurality of video cameras mounted on the vehicle configured to capture video images in a plurality of directions.

5. The mobile lawyer system of claim 1, wherein the database is configured to store information about a plurality of licensed lawyers, including in which jurisdiction where each lawyer is licensed, and contact information for each lawyer.

6. The mobile lawyer system of claim 1, wherein the database is configured to store encrypted data.

7. The mobile lawyer system of claim 1, wherein the at least one identified lawyer is able to receive and view the live-streamed video data of the at least one passenger on a computing device, which is also configured to capture video images of the at least one identified lawyer and transmit them to the remote server.

8. The mobile lawyer system of claim 1, further comprising at least one video camera configured for mounting outside the passenger compartment of the vehicle and capture video images of at least one passenger in the vehicle and surrounding environment.

* * * * *